Feb. 23, 1943.　　　E. W. McKINNEY　　　2,311,677
BACKLASH PREVENTION DEVICE
Filed June 12, 1941
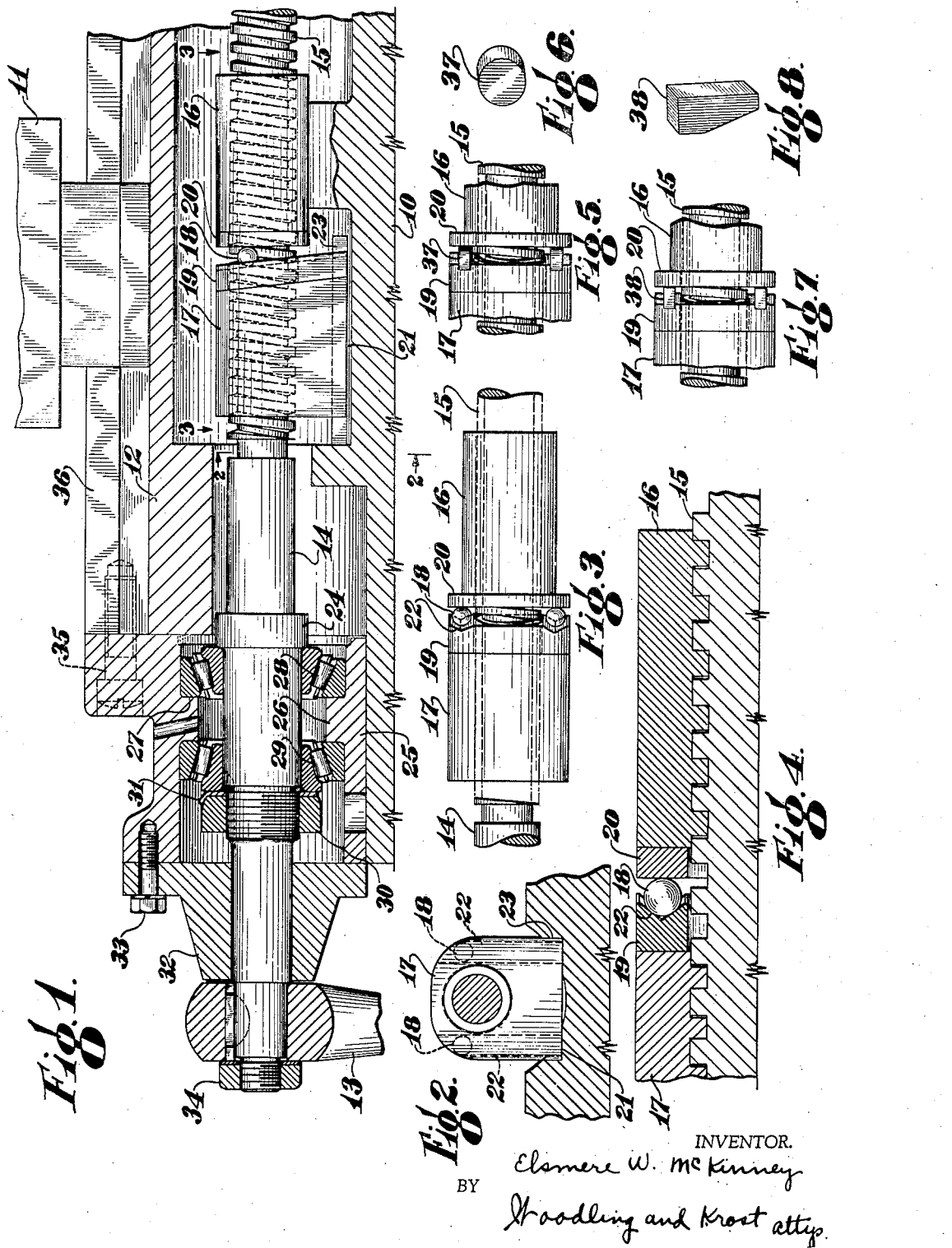
INVENTOR.
Elsmere W. McKinney
BY
Woodling and Krost attys.

Patented Feb. 23, 1943

2,311,677

UNITED STATES PATENT OFFICE 2,311,677

BACKLASH PREVENTION DEVICE

Elsmere W. McKinney, Cleveland, Ohio, assignor to The McKinney Tool and Manufacturing Company, a corporation of Ohio Application June 12, 1941, Serial No. 397,825

9 Claims. (Cl. 74—441)

My invention relates in general to the prevention of lost motion between two elements of a mechanism and more particularly to the prevention of backlash between a threaded element and a threaded member threadably engaging each other.

An object of my invention is the provision of an arrangement for preventing backlash between a threaded element and a threaded member threadably engaging each other.

Other objects and a fuller understanding of my invention may be had by referring to the following description and claims, taken in conjunction with the accompanying drawing, in which:

Figure 1 represents a side, longitudinal cross-sectional view of a mechanism embodying the features of my invention;

Figure 2 is an end cross-sectional view taken along the line 2—2 of Figure 1;

Figure 3 is a view taken along the line 3—3 of Figure 1;

Figure 4 is an enlarged fragmentary view illustrating the manner in which the backlash is eliminated in my invention;

Figure 5 is a fragmentary view based upon Figure 3 but shows a modification thereof;

Figure 6 shows a roller employed in the embodiment shown in Figure 5;

Figure 7 is a view based upon Figure 3 but shows a modification thereof; and

Figure 8 shows a wedge employed in the embodiment shown in Figure 7.

In machine tools and other mechanisms, a work traverse table is arranged to be moved with reference to a stationary support by means of a threaded element operated by a crank or hand wheel. In order to provide for the free turning of the threaded element, there is a slight clearance between the threads of the threaded element and the threaded member in which the threaded element engages. This small clearance results in backlash between the two threaded parts. That is to say, one of the threaded parts has to move before communicating its motion to the other threaded part. My invention is arranged to prevent this backlash.

With reference to the drawing, I illustrate my invention with reference to a mechanism comprising a stationary support 10 above which a work holding device 11 is mounted upon a work traverse table 12 which is arranged to be moved laterally with respect to the stationary support 10 by means of a crank 13 which is arranged to actuate a spindle 14 having a threaded element or portion 15 provided thereon. As illustrated, the threaded element 15 threadably engages a threaded member 16 which is rigidly connected to the stationary support 10. The arrangement of the threaded element 15 turning within the threaded member 16 is of a conventional construction and because of the clearance of the mating threads a backlash is present in the mechanism between the relative movements of the work holding device 11 and the stationary support 10 upon the turning of the crank 13. In my invention I eliminate this backlash by employing a floating threaded device 17 spaced from the threaded member 16 and threadably engaging the threaded element 15. Between the adjacent ends of the threaded member 16 and the floating threaded device 17 I position two ball bearings 18 to constrain the floating threaded device 17 and the threaded member 16 apart and against the opposite side surfaces of the threads of the threaded element 15. As shown, the adjacent ends of the floating threaded device 17 and the threaded member 16 are provided with hardened surface members 19 and 20, respectively, in order to prevent wear. The floating threaded device 17 is constrained in substantially a fixed angular relation with respect to the threaded member 16 to keep the space between adjacent ends of the floating threaded device 17 and the threaded member 16 substantially constant. In the present embodiment of my invention, this constraining action is accomplished by having the bottom of the floating threaded device 17 to slide in a relatively wide groove 21 provided in the stationary support 10. In addition, the lowermost portion of the sides of the floating threaded device 16 is arranged to slide against side walls 23 of the groove 21 in the stationary support 10, see Figures 1 and 2. Other means may be employed to constrain the floating threaded device 17 to remain in substantially a fixed angular relation with respect to the threaded member 15 so long as the space between the adjacent ends of the floating threaded device 17 and the threaded member 16 is kept substantially constant upon the turning of the crank 13 and the threaded element 15. In order to keep the ball bearings 18 in place, the hardened surface member 19 is provided with two substantially vertical spaced grooves 22. The adjacent ends of the floating threaded device 17 and the threaded member 16 are angularly disposed with reference to each other so that the action of the ball bearings 18 is such as to constrain the floating threaded device 17 and the threaded element 16 apart and against the opposite side surfaces of the threads of the threaded element 15.

Inasmuch as the threaded member 16 is stationarily mounted upon the stationary support 10, the turning of the threaded element 15 causes the spindle 14 to move longitudinally with reference to the stationary support 10. The longitudinal movement of the spindle 14 is transmitted to the work traverse table 12 upon which is mounted the work holding device 11. The longitudinal movements of the spindle 14 are first transmitted from a shoulder 24 provided thereon to an internal shoulder 26 provided on a slidable actuating member 25 that slides with reference to the stationary support 10. A roller bearing device 27 having a plurality of rollers 28 is positioned between the shoulder 24 of the spindle 14 and the shoulder 26 of the slidable actuating member 25. A second roller bearing device having a plurality of rollers 29 is positioned between the internal shoulder 26 of the slidable actuating member 25 and a jam nut 30 and a lock washer 31 carried by the spindle 14. Accordingly, the movement of the spindle 14 to the left transmits movement to the slidable actuating member 25 through the roller bearing device having the rollers 28 and movement of the spindle 14 to the right is transmitted to the slidable actuating member 25 through the roller bearing device having the plurality of rollers 29. As shown, the left hand end of the slidable actuating member 25 is enclosed by means of a plate 32 removably secured thereto by means of a threaded element 33. The spindle 14 extends through the plate 32 and the crank 13 is removably secured thereto by means of a nut 34. The right-hand end of the slidable actuating member 25 is connected to the work traverse table 12 by means of screw members 35. The work traverse table 12 may be of the conventional construction in which the work holding device 11 is slidably connected thereto by fitting within longitudinal grooves 36.

In explaining the operation of my device, let it be assumed that the operator desires to move the work holding device 11 to the right with respect to the stationary support 10. In taking care of this right-hand movement, the operator turns the crank 13 in a counter-clockwise direction as viewed from the left-hand side of the crank 13. The instant that the threaded element 15 turns in a counterclockwise direction within the threaded member 16 a longitudinal movement to the right is set up in the spindle 14 for the reason that there is no clearance between the right-hand side surfaces of the threads in the threaded member 16 and the left-hand side surfaces of the threads on the threaded element 15, see Figure 4. Therefore, there is no backlash present in my invention upon the movement of the work holding device 11 to the right. Upon the operator desiring to move the work holding device 11 to the left, the crank 13 is turned in a clockwise direction as viewed from the left-hand side of the crank 13. The instant that the threaded element 15 is turned in a clockwise direction a longitudinal left-hand movement is immediately set up in the spindle 14 for the reason that the left-hand side surfaces of the threads of the floating threaded device 17 directly engages the right-hand side surfaces of the threads of the threaded element 15. That is to say, there is no clearance between the left-hand side surfaces of the threads of the floating threaded device 17 and the right-hand side surfaces of the threads of the threaded element 15. The action of the spindle 14 moving to the left would tend to move the floating threaded device 17 to the right but it is prevented from doing so because the ball bearings 18 readily transmit any tendency of the movement of the floating threaded device 17 to the right to the stationary threaded member 16. Therefore, no backlash is present in my invention upon the movement of the work holding device 11 to the left.

The wedging action of the ball bearings 18 between the adjacent ends of the floating threaded device 17 and the stationary threaded member 16 is such that it does not cause any jamming of the threads of the threaded element 15 within the floating threaded device 17 and the stationary threaded member 16. In the practice of my invention I find that the adjacent ends of the floating threaded device 17 and the stationary threaded member 16 may be angularly disposed at an angle of substantially five degrees with reference to each other and the weight of the ball bearings 18 is such that the floating threaded device 17 is constrained apart from the stationary threaded member 16 by a sufficient amount of force to keep the backlash from being present for both the right and left-hand movements of the work holding device 11. As explained before, the wedging action of the ball bearings 18 within the grooves 22 is not sufficient as to cause jamming of the threads of the threaded element 15 within the floating threaded device 17 and the stationary threaded member 16.

In Figures 5 and 6 I show a modification of my invention in that I employ rollers 37 within vertical grooves instead of the ball bearings 18. The action of the rollers 37 is the same as that described with reference to the ball bearings 18 in order to prevent any backlash being present in my invention. In Figures 7 and 8 I show a further modification in that I employ wedges 38 fitting within vertical grooves instead of the roller bearings 18. The action of the wedges 38 in constraining the floating threaded device 17 and the stationary threaded member 16 apart is the same as that described with reference to the employment of the ball bearings 18 within the vertical grooves 22.

It is clearly apparent that the mechanism in which my backlash prevention device may be employed may be different from the mechanism shown in the drawing. In other words, the combination of the threaded member 16 and the floating threaded device 17 may be arranged to move longitudinally as a unit and with the spindle 14 remaining longitudinally stationary. This is just the reverse from that shown in the patent drawing. Regardless of the environment or mechanism in which my backlash prevention device may be employed, it prevents backlash in both directions and thus movement is immediately transmitted without lost motion upon the turning of the threaded element 15 of the spindle 14 by the crank 13.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having angularly disposed surfaces with reference to each other, and ball means engaging the angularly disposed surfaces of said adjacent ends to constrain the floating threaded device and the threaded member apart and against the opposite side surfaces of the threads of the threaded element.

2. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having angularly disposed surfaces with reference to each other, and roller means engaging the angularly disposed surfaces of said adjacent ends to constrain the floating threaded device and the threaded member apart and against the opposite side surfaces of the threads of the threaded element.

3. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having angularly disposed surfaces with reference to each other and converging toward each other in a downward direction, and wedge means urged downwardly by gravity between the angularly disposed surfaces of the said adjacent ends to constrain the floating threaded device and the threaded member apart and against the opposite side surfaces of the threads of the threaded element.

4. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having angularly disposed surfaces with reference to each other and converging toward each other in a downward direction, and means urged downwardly by gravity between the angularly disposed surfaces of the said adjacent ends to constrain the floating threaded device and the threaded member apart and against the opposite side surfaces of the threads of the threaded element.

5. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having angularly disposed surfaces at a relatively small angle with reference to each other, and ball means engaging the angularly disposed surfaces of said adjacent ends to constrain the floating threaded device and the threaded member apart and against the opposite side surfaces of the threads of the threaded element, one of said adjacent ends having groove means to hold the ball means in place.

6. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having angularly disposed surfaces at a relatively small angle with reference to each other, said angularly disposed surfaces defining vertical groove means on opposite sides of the threaded element with their surfaces converging toward each other in a downward direction, and means in the groove means urged downwardly by gravity between the converging surfaces to constrain the threaded device and threaded member apart and against the opposite side surfaces of the threads of the threaded element.

7. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having angularly disposed surfaces with reference to each other and converging toward each other in a downward direction, and spreading means having a circular surface urged downwardly by gravity between the angularly disposed surfaces of said adjacent ends to constrain the floating threaded device and the threaded member apart and against the opposite side surfaces of the threads of the threaded element.

8. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having angularly disposed surfaces at a relatively small angle with reference to each other, said angularly disposed surfaces defining vertical groove means on opposite sides of the threaded element with their surfaces converging toward each other in a downward direction, and circular means in the groove means urged downwardly by gravity between the converging surfaces to constrain the threaded device and threaded member apart and against the opposite side surfaces of the threads of the threaded element.

9. An arrangement for preventing backlash between a threaded element and a threaded member threadably engaging each other comprising, in combination, a floating threaded device spaced from the threaded member and threadably engaging the threaded element, means to constrain the floating threaded device in substantially a fixed angular relation with respect to the threaded member to keep the space between adjacent ends of the floating threaded device and the threaded member substantially constant, the adjacent ends of the floating threaded device and the threaded member having angularly disposed surfaces at a relatively small angle with reference to each other, said angularly disposed surfaces defining vertical groove means on opposite sides of the threaded element with their surfaces converging toward each other in a downward direction, and wedge means in the groove means urged downwardly by gravity between the converging surfaces to constrain the threaded device and threaded member apart and against the opposite side surfaces of the threads of the threaded element.

ELSMERE W. McKINNEY.